July 12, 1932.  J. A. CAMPBELL  1,867,208
METHOD OF ABSORPTION
Original Filed July 19, 1926
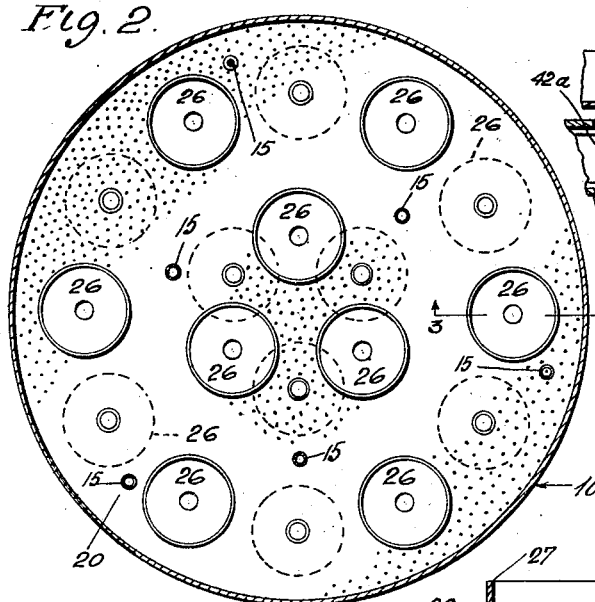
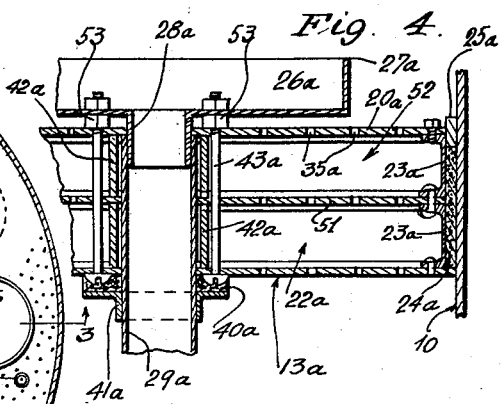
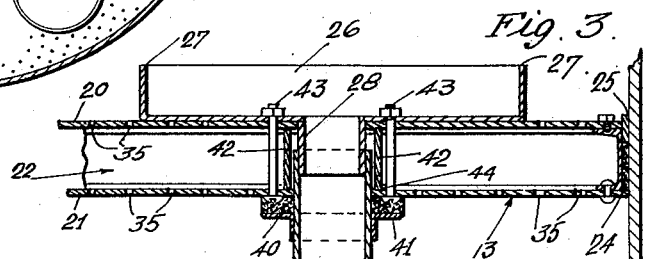
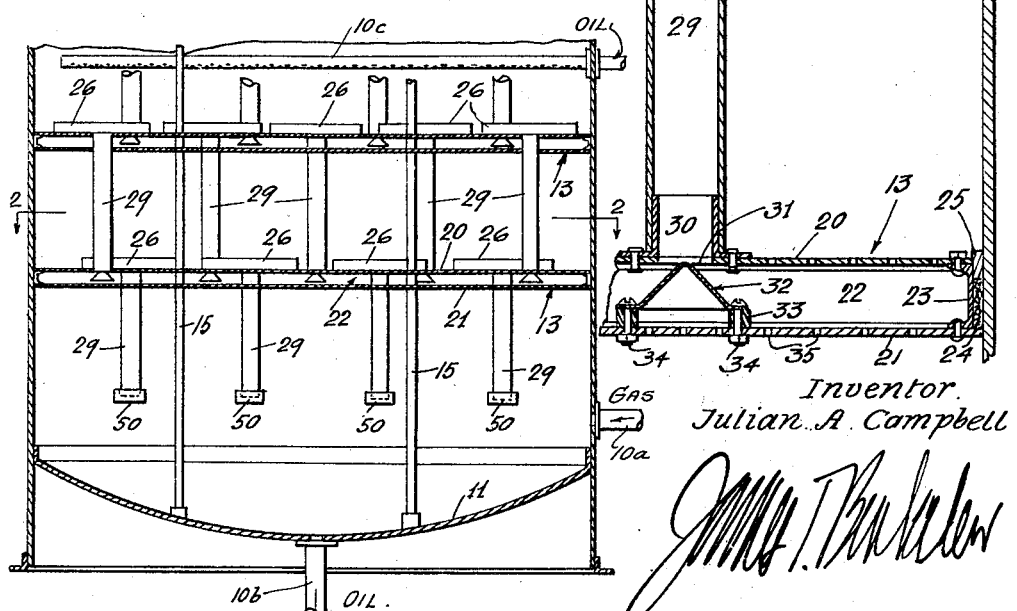
Inventor.
Julian A. Campbell
Attorney.

Patented July 12, 1932

1,867,208

UNITED STATES PATENT OFFICE

JULIAN A. CAMPBELL, OF LONG BEACH, CALIFORNIA

METHOD OF ABSORPTION

Original application filed July 19, 1926, Serial No. 123,417. Divided and this application filed February 24, 1930. Serial No. 430,642.

This invention relates in general to methods for bringing liquids and gases or vapors into intimate contact, for instance for the purpose of absorbing gas or vapor in liquid as carried out in absorption systems which operate to bring about the absorption of liquid volatile petroleum vapors in comparatively heavy and stable absorption oil. The present application, dealing with a method of absorption, is a division of my copending application on absorbers, Ser. No. 123,417, filed July 19, 1926, said application having matured into Patent No. 1,814,125 on July 14, 1931, in which the claims are drawn to the structural features of an apparatus for carrying out this method. The method comprising the subject matter of my present application is also similar in nature to the method described in my copending application on method of absorption, Ser. No. 240,742, filed December 17, 1927, certain of the claims in the present application covering broadly the method disclosed in Ser. No. 240,742.

The object of the hereinafter described method, in bringing about intimate admixture and gas or vapor, may be to absorb condensible vapors from the gases, to load a gas or vapor with substances which they pick up from the liquid by reason of intimate contact therewith, or for various other purposes. Therefore, although I term the present method as one of absorption, and will describe it as such since its principle use will in most instances be for this purpose, it will be understood that the invention is not thereby to be considered as limited to such use.

The present application is in its general subject matter, similar to that of a patent on method of absorption, No. 1,736,070 issued to me on November 19, 1929. The method described in this patent is one in which gases or vapors are treated with liquid by building up and maintaining the liquid in a body of froth, both the liquid and gas being introduced in intimate contact at the base of the froth body so as to build it up from its lower part, and continuously breaking the froth at its upper surface to liberate the gas or vapors and separate the liquid. Although similar to this method in certain of its aspects, the present invention has to do more particularly with the method of bringing the gases or vapors into direct and intimate contact with the liquid.

In certain of my previous types of absorbers, for instance, the type illustrated in the above mentioned Patent No. 1,736,070, and in Patent No. 1,654,785 issued to me January 3, 1928, on absorber, contacting of the liquid and gas has been brought about by the use of a series of perforated floors, each floor being in the form of a single perforated plate and the oil on a given floor being delivered to it from the floor next above. Gas is introduced beneath the perforated plates and is caused to bubble up through the liquid thereon. In absorption apparatus of this type, it is found that a portion of the liquid does not come directly into intimate contact with the gas since there necessarily is an appreciable distance between adjacent plate orifices and the streams of bubbles passing upwardly from these orifices are accordingly somewhat widely spaced apart, with the result that the liquid between these streams is not immediately affected by the gas flow.

It is a purpose of the present invention to provide a method of absorption whereby this difficulty is overcome by insuring intimate contact between the gas and practically all the liquid. Generally speaking, this is accomplished by forcing the liquid and gas together through restrictions, in contradistinction to the old method of merely passing the gas through restrictions into the body of liquid. The liquid preferably is first built up into a body of froth, and this may be done in substantially the same method as described in Patent No. 1,736,070; that is, by introducing both liquid and gas in intimate contact at the base of the froth body so as to continuously build up the froth from its lower part. The froth then is forced through a suitable apertured medium, preferably one or more perforated plates or similar media, and the froth after passing through the restrictions being broken up and the constituents thereof separated.

It will be understood that any suitable apparatus may be employed for carrying out the present method, and that although I will hereinafter describe the method as carried out in one form of apparatus, the invention is not necessarily limited to this particular type.

The typical form of apparatus for carrying out the present method may conveniently comprise one or more floors in a suitable shell and consisting of two or more vertically spaced and perforated plates. Gas occupies the full cross-section of the shell below the lowermost plate and oil is admitted to the space between plates from the floor next above. The gas is forced upwardly through relatively small orifices in the lower plate, its velocity thereby being increased appreciably, and the rapid flow of this gas into the body of oil or other liquid above the lowermost plate whips the liquid into a froth consisting of innumerable oil film bubbles. These bubbles, that is, vesicles of oil containing gas, are carried upwardly through the orifices in the super-imposed plate or plates and in passing through these orifices the bubbles are broken up and the gas within them brought into contact with the oil released from the films of the broken bubbles and with any unfrothed oil, such unfrothed oil being forced with the bubbles through the upper plate orifices.

Furthermore, the high velocity of the gas, by reason of being suddenly constricted in its flow from the full and free cross-section of the shell to the very limited aggregate area of the orifices, has an atomizing effect upon the oil so the oil-film bubbles are more or less filled with a mist of the atomized liquid, a condition which is not conducive to the absorption of any absorbable vapors which the gas may contain.

When the bubbles reach the surface of the liquid above the uppermost plate, they burst and the gas frees itself from the oil and once more occupies the full cross-section of the shell but at a point above the floor.

Should more than one apertured plate be provided beneath the uppermost plate, the action through the additional plate or plates is practically the same as through the uppermost plate, that is, such plates function to constrict the bubbles suddenly, breaking them up and bringing the gas into intimate contact with the broken films. Of course, as the bubbles are broken up in passing through the plate orifices, new bubbles are constantly being formed. After passing through the additional plates, however, the bubbles do not reach the surface of a free body of liquid so as to burst naturally, until they have passed through the uppermost plate, in other words, the space between plates is practically filled with froth. The effect of using additional plates in each floor multiplies the beneficial effects gained by the use of one such plate but increases the pressure drop through the apparatus. This, alone, is the limiting factor in their use.

The liquid passes into overflow pans above the uppermost plate and thence drops to the floor next below, and it will be seen that every bit of oil thus passed has previously been forced upwardly through gas-passing apertures and has therefore been in intimate contact with the gas.

The invention will be most readily and fully understood from the following detailed description of a typical and preferred form of apparatus for carrying out the method.

The accompanying drawing illustrates a typical form that the invention may take. In the drawing:

Fig. 1 is a fragmentary vertical central section of the lower part of a bubble tower;

Fig. 2 is a horizontal section on line 2—2 of Fig. 1; and

Fig. 3 is a fragmentary enlarged detailed section on line 3—3 of Fig. 2.

In the drawing the lower part of a cylindrical shell is shown at 10, and its bottom 11 is preferably made in the form illustrated in Fig. 1, its similar top not being shown. At 10a is an inlet for the rich gas under pressure; and at 10b an outlet for the laden absorbing oil. Above the bottom there may be as many superimposed floors 13 as may be desired. In the structural form herein shown these floors are supported by vertical supporting columns 15 extending upwardly from the bottom of the shell. The details of these supports need not here be gone into as they are the particular subject matter of the first mentioned co-pending application.

Each floor 13, in accordance with my present invention, is made up of a series of vertically spaced plates, two or more in number; and in Figures 2 and 3 I have shown each floor consisting of an upper and a lower plate 20 and 21, these plates preferably being circular and forming a froth chamber 22 between them. It will be understood, however, that this showing of only two plates to each floor is not limitative on the invention considered in its broader aspects. It may be mentioned that the invention in its broader aspects is not necessarily limited to the use of perforated plates as floors, and that other apertured means, such as screen and the like may be used. Chamber 22 is bound at its circular edge by a peripheral wall 23 constructed of a channel iron bent to circular shape. The several floors being supported by columns 15, they are not supported from the exterior shell 10, but means are provided for making a fluid tight joint between the floors and the exterior shell. In general this fluid tight joint is provided by packing 24 around the edge of each floor, with a follower ring 25 above the package. The subject matter of this packing is, however, fully described in the first mentioned one of my co-pending applications and need not be described in detail here.

Above each floor, and in Figures 2 and 3 shown as resting on the upper surface of each floor, is a plurality of overflow pans 26, these pans being relatively flat and shallow, arranged in symmetrical order about the center of the floor, and altogether covering a substantial proportion of the floor area. It is not essential to the invention, however, that the pans rest directly on the uppermost plate of the floor; in fact, in certain situations, it is preferable that the pans be spaced vertically above the uppermost plate, as shown in Figure 4 and as will be described at a latter point herein. Preferably the circular edges of these pans may be somewhat sharp, as indicated at 27; a good way of making these sharp edges being merely to leave edge 27 raw as it comes from a flanging machine or a shears. The bottom of each pan has a short depending nipple 28 that extends down through an opening in upper plate 20; this nipple extending at its lower end into a vertical tube 29 that passes through the lower plate 21 and extends on down to the upper plate 20 of the next floor below. A sufficiently tight joint is made with the last mentioned plate 20 by having the lower end of tube 29 telescope around a nipple 30 mounted on that plate 20. Said upper plate 20 has an opening at 31 registering with each nipple 30; and directly below this opening and mounted on the corresponding lower plate 21 there is a spreader cone 32. This cone is preferably not mounted directly on plate 21 but has its lower edge spaced somewhat above plate 21 by using spacers 33 around the mounting bolts 34.

Both plates 20 and 21 are perforated substantially throughout their entire extent, as is shown at 35, the lower plate 21 being also perforated under spreader cones 32. The upper plate may or may not be perforated under pans 26, the perforations under the pans resting on that plate being inoperative even if they are present. Consequently in Fig. 3 the part of plate 20 under pan 26 is shown unperforated.

A fluid tight joint is maintained between tube 29 and the lower plate 21 through which the tube passes by means of a packing 40 that is compressed between a flange 41 and the under face of plate 21; and any leakage of gas or liquid from the chamber 22 between the plates is further prevented by a nipple 42 that surrounds nipple 28 and the upper end of tube 29 and is tightly clamped between the two plates by bolts 43, which bolts also hold pan 26 down to the floor. The lower edge of nipple 42 may also be welded, as indicated at 44, to bottom plate 21 so as to prevent any fluid from flowing under the lower edge of that nipple. The nipples also perform the function of accurately spacing the two plates apart at several spaced points, so as to keep the two plates, throughout their extents, at uniform spacing.

Although it will be readily recognized that the sizes of the plate perforations and their spacings will depend upon the character of liquid being treated and also upon the amount of gas that is being put through a tower, I may say that in a typical instance the perforations in the lower plate may be about $\frac{5}{32}$ inch diameter, while those in the upper plate may be somewhat larger or about $\frac{3}{16}$ inch diameter, the perforations of the bottom plate being on one-inch centers and of the top plate on $\frac{3}{4}$ inch centers. The top plate is thus given somewhat greater aggregate area of gas passing orifices than is the lower plate; but it must be remembered that in the operation of the device the pressure under the lower plate is also somewhat greater than the pressure under the upper plate. Gas is always fed in at the bottom of the absorber shell and passes successively up through the several superposed floors so that at each floor and at each perforated plate of each floor the gas drops somewhat in pressure.

For the purpose of illustrating introduction of absorbing oil to an uppermost floor, a piece 10c is shown in Fig. 1 introducing the oil above the highest floor there shown. It will be understood that as many superimposed floors as desired may be used.

In operation the liquid, typically hydrocarbon oil, petroleum or petroleum derivative, is fed in at the top of the tower and, spreading out over the uppermost floor, is raised into a froth by the gas fed in at the bottom and passing up through the perforated floors, until the froth reaches the level of the pan edges. Here the froth, breaking up, liberates liquid oil which flows over the pan edges into the pans and thence down through tubes 29 to the enclosed chamber 22 of the next floor below, being spread out by cones 32. The fact that there are perforations 35 under the cones, with gas consequently passing radially outwardly under the cone edges, also assists in the spread of the liquid over lower plate 21, so that the liquid is spread in a compartively thin film widely around each cone.

The gas passing up through the lower plate perforations picks up this thin film of oil, forming bubbles, and chamber 22 becomes filled with a frothy mass which is more or less completely in the form of bubbles. This mass of froth is being constantly moved up by the upwardly flowing gas forming new froth below; so that the mass of froth, and with it any unbubbled or unfrothed oil, is carried up to the upper plate 20 and forced through the perforations in the upper plate. The speed at which this frothy mass moves upwardly and the velocity at which the froth and the liquid oil is projected through perforations 35 of the upper plate depend, of course, upon the size and number of the perforations and the amount of gas and oil being fed to the absorber, and the pressure present at the plates. But in practical operation the conditions are made such that the froth and any free oil is forced up through the upper perforations 35 with some little velocity so that any liquid oil is more or less atomized and becomes intimately admixed with gas that is forced out of any bubble or bubbles too large in size to pass freely through upper perforations. The passage through the upper perforations, therefore, bursts the gas bubbles and re-forms bubbles of substantially uniform size. This action brings the gas into intimate contact with any oil that has not been bubbled at the lower plate, forming above the upper plate a uniform mass largely of froth. As a consequence the gas is brought into very uniform and intimate contact with all the oil which is subsequently passed to the floor next below, with the result that absorption by the oil is very uniform and highly efficient. The bubbles burst naturally, or by contact with the pan edges, when they reach the surface of the liquid and the gas is thus freed for action with the oil on the floor next above.

The mass of froth above any selected floor plate, is under a certain maintained pressure, due to the initial introduction of the laden gas under pressure at the bottom of the absorber. In the perforations of, for instance, the upper plate of each floor pair, there is a certain drop of pressure, resulting in a substantial velocity of flow through the perforations. In practice, the pressures on the apparatus may be maintained so that, as a typical instance, the drop in pressure at each perforated plate is about 0.2 pounds per sq. in. When the froth is forced through the upper plate perforations, the action at and within the perforations is, to some extent at least, to make the froth bubbles of uniform size, and to form into bubbles any comparatively larger mass of either gas or oil which might have escaped intimate frothing action at the lower perforated plate. Soon after formation of the froth above the upper plate perforations, some of the froth bubbles may burst, under the expansive action induced by the lowered pressure in the space above the upper plate.

The action of breaking the froth bubbles as a whole may be looked upon as being brought about by two agencies. First, the velocity of flow through the perforations or the reduced pressure above the upper plate is effective in causing the froth to break up; and second, the froth breaking pans cause, as previously described, the froth to become broken up in flowing over their sharp edges. And it may be stated that the pans not only serve to break up the froth at the rate at which it is formed, but also to separate the liquid and gaseous constituents of the froth by conducting the liquid to the down pipes and permitting the liberated gases to escape to the plate next above. Although in the broad aspects of my invention, the froth breaking action may result from the bubbles being permitted to burst naturally, and/or as a direct result of their flowing over the sharp pan edges, the pans preferably are located below the level to which the froth would normally build up in the absence of mechanical froth breaking means, with the result that the pans will act to accomplish the greater portion of the froth-breaking due to the fact that the sharp edges act upon the froth before sufficient time is allowed for the bubbles to burst naturally.

It will be understood that this action is repeated at each floor, each floor receiving oil from the floor above and, in turn, being provided with overflow pans delivering the liquid oil into chamber 22 of the next floor below. Under the lowermost floor the discharge tubes 29 will have at their lower ends suitable liquid trap cups 50 to prevent passage of gas upwardly through the lowermost tubes 29. Passage of gas up through the other tubes 29 is prevented by the fact that those tubes normally contain columns of oil.

Although, as I have shown the proportions and arrangements in the drawing, the several plates 20 and 21 are closer together in each floor than the spacings between the several floors, it will readily be recognized that these proportional spacings are not a limitation upon the invention. Typically, in practical construction the two plates of each floor will be closer together than adjacent floors; and typically the plates of each floor are made into a structural unit. But the structure and arrangement of the absorber as a whole may be looked upon as one embodying a plurality of spaced perforated plates, alternate spaces between plates being froth chambers and the remaining spaces between plates being chambers in which the froth is broken up and the liquid oil fed downwardly to the next froth chamber below. Or, the perforated plates may be said to function in pairs, without necessarily being structurally associated together in pairs. The plates of each pair enclose the froth chamber; the chambers between pairs or those in which the froth is broken up. Considering the invention in this light, it will be seen that it is not in its broader aspects to be limited by the typical structural details herein explained, although in practical use these structural details may usually be used.

In Fig. 4 I have shown a fragment of a tower wherein certain variational characteristics are illustrated, the variations consisting mainly of the provision of more than two plates to a floor, the spacing of the overflow pans above the uppermost plate and the provision of operative apertures in said plate beneath the pan.

In this figure, such parts of the structure as are like corresponding parts of the previously described structure, are given similar reference numerals, but with the exponent "a". Floor 13a is made up of uppermost plate 20a, lowermost plate 21a and intermediate plate 51; the plates being spaced apart any suitable distance and forming upper froth chamber 52 and lower froth chamber 22a. The supporting and sealing of the plates, nipples, etc., may be accomplished in the manner described in connection with the other figures; and it will be understood I may employ more than three spaced plates in making up each floor.

Overflow pans 26a, of which only one is shown in Fig. 4, are similar to pans 26, but are here shown as being spaced vertically above plate 20a by such means, for instance, as spacing nuts 53 on bolts 43a, the latter serving to clamp the plate and nipple assembly together as described above.

It may here be stated that the feature of spacing the overflow pans above the uppermost plate is not limited in application to the structure shown in Fig. 4, but may also be embodied in the structure of Figs. 2 and 3, as will be readily understood. It will also be understood that it is not essential to the "three or more plate" type of floor that the overflow pans be spaced above the uppermost floor, but that in some situations I may rest the pans upon the uppermost plate in the manner illustrated in Figs. 2 and 3.

The assembly of pans, nipple 28a, tube 29a, spacing nipples 42a, etc., may be similar to that described in connection with corresponding parts of the other figures.

With the overflow pans spaced above plate 20a, it is preferable that apertures 35a be provided directly beneath the pans, as illustrated. The connection of tube 29a with the floor below, is the same as previously described in connection with tube 29.

The operation of the variational structure shown in Fig. 4 is generally similar to that described in connection with the other figures, except that the froth from chamber 22a is forced through the apertures in plate 51 before it passes through chamber 52 and the apertures in plate 20a, insuring a thorough admixture of the gas and oil.

I claim:—

1. The method of causing intimate contact between a gas and a liquid, that includes forming a froth of the gas and liquid at any certain pressure, and then breaking the froth films into fine particles in an atmosphere of the gas at a comparatively less pressure, there being a relatively abrupt pressure change between the pressure at which the froth is formed and the pressure of the gaseous atmosphere in which the froth is broken up.

2. The method of causing intimate contact between a gas and a liquid, that includes forming a froth of the gas and liquid at a certain pressure, and then allowing the froth to expand in atmosphere of the gas at a comparatively less pressure, there being a relatively abrupt pressure change between the pressure at which the froth is formed and the pressure of the gaseous atmosphere in which the froth is allowed to expand.

3. The method of bringing liquid and gas into intimate contact, that includes continuously forming and maintaining a body of froth, the froth being formed by the introduction of both liquid and gas or vapor in intimate contact at the lower part of the froth body, forcing the froth thus formed upwardly through restricted orifices directly above the froth body, breaking and separating the froth into liquid and gas at an upper point in the froth mass, and isolating the separated liquid from the froth mass.

4. The method of bringing liquid and gas or vapor into intimate contact, that includes continuously forming and maintaining a body of froth, the froth being formed by the introduction of both liquid and gas or vapor in intimate contact at the lower part of the froth body, forcing the froth thus formed upwardly through restricted apertures, and continuously breaking up the froth and liberating the gas or vapor at the upper surface of the froth body at the same rate at which the froth is formed.

5. The method of bringing liquid and gas into intimate contact, that includes continuously building up a mass of froth of the gas and liquid by feeding the liquid in a thin layer to the bottom of the froth mass and jetting the gas under pressure upwardly through the liquid layer, forcing the froth mass upwardly through a plurality of restricted orifices smaller than the froth bubbles and thereby rendering the froth mass uniform and homogeneous, breaking and separating the froth into liquid and gas at an upper point in the froth mass, and conducting the separated liquid downwardly through the froth mass.

6. The method of bringing liquid and gas into intimate contact, that includes continuously building up a mass of froth of the gas and liquid by feeding the liquid in a thin layer to the bottom of the froth mass and jetting the gas under pressure upwardly through the liquid layer, forcing the froth mass upwardly through a plurality of restricted orifices smaller than the froth bubbles and thereby rendering the froth mass uniform and homogeneous, and mechanically breaking up the froth and liberating the gas at the upper surface of the froth body at the same rate at which the froth is formed.

7. The method of bringing liquid and gas into intimate contact, that includes forcing the liquid and gas together through restricted apertures and building up a body of froth, mechanically breaking the froth at the upper surface of the froth body whereby the froth films are coalesced into liquid, and separating the coalesced liquid from the froth body.

8. The method of bringing liquid and gas into intimate contact, that includes forcing the liquid and gas together through restricted apertures and building up a body of froth, mechanically breaking the froth at the upper surface of the froth body whereby the froth films are coalesced into liquid, and conducting the coalesced liquid downwardly through the froth body.

In witness that I claim the foregoing I have hereunto subscribed my name this 24th day of January, 1930.

JULIAN A. CAMPBELL.